(12) United States Patent
Wang et al.

(10) Patent No.: US 12,166,742 B2
(45) Date of Patent: Dec. 10, 2024

(54) DOMAIN NAME RESOLUTION METHOD AND APPARATUS, AND COMPUTER DEVICE

(71) Applicant: SHANGHAI BILIBILI TECHNOLOGY CO., LTD., Shanghai (CN)

(72) Inventors: Sheng Wang, Shanghai (CN); Hanghang Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/277,946

(22) PCT Filed: Jan. 19, 2022

(86) PCT No.: PCT/CN2022/072800
§ 371 (c)(1),
(2) Date: Aug. 18, 2023

(87) PCT Pub. No.: WO2022/179353
PCT Pub. Date: Sep. 1, 2022

(65) Prior Publication Data
US 2024/0314102 A1    Sep. 19, 2024

(30) Foreign Application Priority Data

Feb. 5, 2021    (CN) .......................... 202110212888.5

(51) Int. Cl.
*G06F 15/16* (2006.01)
*H04L 61/4511* (2022.01)
(52) U.S. Cl.
CPC ................................ *H04L 61/4511* (2022.05)
(58) Field of Classification Search
None
See application file for complete search history.

(56) References Cited

U.S. PATENT DOCUMENTS

| 2016/0308821 A1 | 10/2016 | Siba et al. | |
| 2020/0259781 A1* | 8/2020 | Mo | H04L 67/563 |
| 2021/0226951 A1* | 7/2021 | Goldstein | H04L 63/20 |

FOREIGN PATENT DOCUMENTS

| CN | 102984299 A | 3/2013 |
| CN | 107635027 A | 1/2018 |

(Continued)

OTHER PUBLICATIONS

International Patent Application No. PCT/CN2022/072800; Int'l Search Report; dated Apr. 20, 2022; 2 pages.

*Primary Examiner* — Wing F Chan
*Assistant Examiner* — Andrew Woo
(74) *Attorney, Agent, or Firm* — BakerHostetler

(57) ABSTRACT

This application discloses a domain name resolution method and apparatus, and a computing system. The method includes: receiving a resource address entered by a user; obtaining a target domain name corresponding to the resource address, where the target domain name is generated based on a preset domain name encryption rule, and the preset domain name encryption rule is applied to combine a domain name field and an IP address into the target domain name; and parsing the target domain name and obtaining the IP address in the target domain name based on a preset domain name decryption rule. This application further provides a computer-readable storage medium. In this application, the resource address entered by the user is directly resolved, so that the IP address can be rapidly obtained through resolution, thereby shortening domain name resolution time and improving domain name resolution efficiency.

16 Claims, 3 Drawing Sheets

(56) References Cited

FOREIGN PATENT DOCUMENTS

| | | | |
|---|---|---|---|
| CN | 108650338 | A | 10/2018 |
| CN | 109347997 | A | 2/2019 |
| CN | 111193815 | A | 5/2020 |
| CN | 111371911 | A | 7/2020 |
| CN | 111447296 | A | 7/2020 |
| CN | 112039888 | A | 12/2020 |
| CN | 112887451 | A | 6/2021 |
| WO | WO 2015/179244 | A1 | 11/2015 |
| WO | WO 2016/184349 | A1 | 11/2016 |

\* cited by examiner

DOMAIN NAME RESOLUTION METHOD AND APPARATUS, AND COMPUTER DEVICE

CROSS-REFERENCE TO RELATED APPLICATIONS

This application is the U.S. National Stage of International Application No. PCT/CN2022/072800, filed on Jan. 19, 2022, which claims priority to Chinese Patent Application No. 202110212888.5, filed on Feb. 25, 2021, and entitled "DOMAIN NAME RESOLUTION METHOD AND APPARATUS, AND COMPUTER DEVICE", both of which are incorporated herein by reference in their entireties.

TECHNICAL FIELD

This application relates to the field of Internet technologies, and in particular, to a domain name resolution method and apparatus, and a computing system.

BACKGROUND

Domain name resolution is a technology for enabling a domain name to point to an internet protocol (IP) address of a website space, so that people can conveniently access a website by using a registered domain name. However, an IP address is a group of numbers used to identify a site in a network and therefore is not easy to remember. Therefore, to facilitate remembering, a domain name is usually used instead of an IP address to identify a site address.

Domain name resolution is a process of translating a domain name into an IP address. In addition, domain name resolution is completed by a domain name system (DNS) server, namely, a domain name server. When a client needs to access a network, a domain name is entered to a browser. Then, the domain name is sent to the domain name server for domain name resolution, and then an IP address is returned to the client, so that the client can perform resource access on a server corresponding to the IP address.

However, in the conventional technology, in this domain name resolution technology, domain name resolution needs to be performed by using the domain name server. Therefore, additional resource access time needs to be consumed, and efficiency of a domain name resolution process is low.

SUMMARY

This application provides a domain name resolution method and apparatus, and a computing device, to resolve a problem that domain name resolution time is long and domain name resolution efficiency is low in a domain name resolution process in the conventional technology.

First, to implement the foregoing objective, this application provides a domain name registration method, including:
receiving a domain name field and an IP address that are sent by a data server computing system; combining the domain name field and the IP address according to a preset domain name encryption rule to generate a domain name corresponding to the IP address, and registering the domain name; and synchronizing a domain name decryption rule corresponding to the domain name encryption rule to a domain name resolution configuration file.

In an example, the domain name encryption rule includes: generating an IP field based on the IP address in a form of a number, a punctuation, and a character, and combining the IP field and the domain name field into the domain name corresponding to the IP address.

In an example, when the IP address includes IP addresses of different protocol versions, the combining the domain name field and the IP address according to a preset domain name encryption rule includes: jointly writing the IP addresses corresponding to all the protocol versions to the domain name corresponding to the IP address, and marking the corresponding protocol versions.

In an example, the jointly writing the IP addresses corresponding to all the protocol versions to the domain name corresponding to the IP address, and marking the corresponding protocol versions includes: separating the IP addresses corresponding to the different protocol versions by using different delimiters, where each delimiter separates an IP address of one protocol version.

In an example, the domain name resolution configuration file is stored in a preset local storage unit.

To implement the foregoing objective, this application further provides a domain name resolution method, including:
receiving a resource address entered by a user; obtaining a target domain name corresponding to the resource address, where the target domain name is generated according to a preset domain name encryption rule, and the domain name encryption rule is used to combine a domain name field and an IP address into the target domain name; and obtaining the IP address in the target domain name through resolution according to a preset domain name decryption rule.

In an example, the obtaining a target domain name corresponding to the resource address includes: identifying the domain name field included in the resource address; and supplementing the domain name field according to a preset domain name correction rule, to obtain the corresponding target domain name.

In an example, the obtaining the IP address in the target domain name through resolution according to a preset domain name decryption rule includes: identifying an IP field in the target domain name; and identifying a number, a punctuation, and a character in the IP field to obtain the corresponding IP address.

In an example, the domain name decryption rule is stored in a domain name resolution configuration file in a preset local storage unit.

In an example, the method further includes: when the IP address in the target domain name cannot be obtained through resolution according to the domain name decryption rule or the domain name resolution configuration file does not include the domain name decryption rule, sending the target domain name to a domain name server computing system for resolution; and downloading a domain name resolution configuration file of the latest version from the domain name server computing system.

In an example, after the step of obtaining a target domain name corresponding to the resource address, the method further includes: obtaining the IP address in the target domain name through resolution according to the domain name decryption rule, and simultaneously sending the target domain name to the domain name server to obtain the IP address corresponding to the target domain name through resolution by using the domain name server computing system; and after obtaining the IP address corresponding to the target domain name through resolution by using the domain name decryption rule or the domain name server computing system, performing resource access based on the IP address that is first obtained through resolution.

In addition, to implement the foregoing objective, this application further provides a domain name registration apparatus, including:

a first receiving module, configured to receive a domain name field and an IP address that are sent by a data server computing system; a registration module, configured to: combine the domain name field and the IP address according to a preset domain name encryption rule to generate a domain name corresponding to the IP address, and register the domain name; and a synchronization module, configured to synchronize a domain name decryption rule corresponding to the domain name encryption rule to a domain name resolution configuration file.

Further, this application further provides a domain name resolution apparatus, including:

a second receiving module, configured to receive a resource address entered by a user; an obtaining module, configured to obtain a target domain name corresponding to the resource address, where the target domain name is generated according to a preset domain name encryption rule, and the domain name encryption rule is used to combine a domain name field and an IP address into the target domain name; and a resolution module, configured to obtain the IP address in the target domain name through resolution according to a preset domain name decryption rule.

Further, this application further provides a computing system. The computing system includes a memory and a processor, the memory stores a computer program that can be run on the processor, and the steps of the foregoing domain name registration method or the steps of the foregoing domain name resolution method are implemented when the computer program is executed by the processor.

Further, to implement the foregoing objective, this application further provides a computer-readable storage medium. The computer-readable storage medium stores a computer program, and the computer program can be executed by at least one processor, to enable the at least one processor to perform the steps of the foregoing domain name registration method or the steps of the foregoing domain name resolution method.

Compared with the conventional technology, according to the domain name resolution method and apparatus, the computing system, and the computer-readable storage medium provided in this application, the resource address entered by the user can be received; the target domain name corresponding to the resource address can be received, where the target domain name is generated according to the preset domain name encryption rule, and the domain name encryption rule is used to combine the domain name field and the IP address into the target domain name; and the IP address in the target domain name can be obtained through resolution according to the preset domain name decryption rule. The resource address entered by the user is directly resolved, so that the IP address can be rapidly obtained through resolution, thereby shortening domain name resolution time and improving domain name resolution efficiency.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application. All other embodiments obtained by a person of ordinary skill in the art based on the embodiments of this application without creative efforts shall fall within the protection scope of this application.

It should be noted that the description related to "first", "second", or the like in this application is merely used for description, and shall not be understood as an indication or implication of relative importance of the description or an implicit indication of a quantity of indicated technical features. Therefore, a feature limited by "first" or "second" may explicitly or implicitly include at least one feature. In addition, the technical solutions in the embodiments may be combined with each other, provided that a person of ordinary skill in the art can implement the combination. When the combination of the technical solutions is contradictory or cannot be implemented, it should be considered that the combination of the technical solutions does not exist or does not fall within the protection scope of this application.

Figure 1:
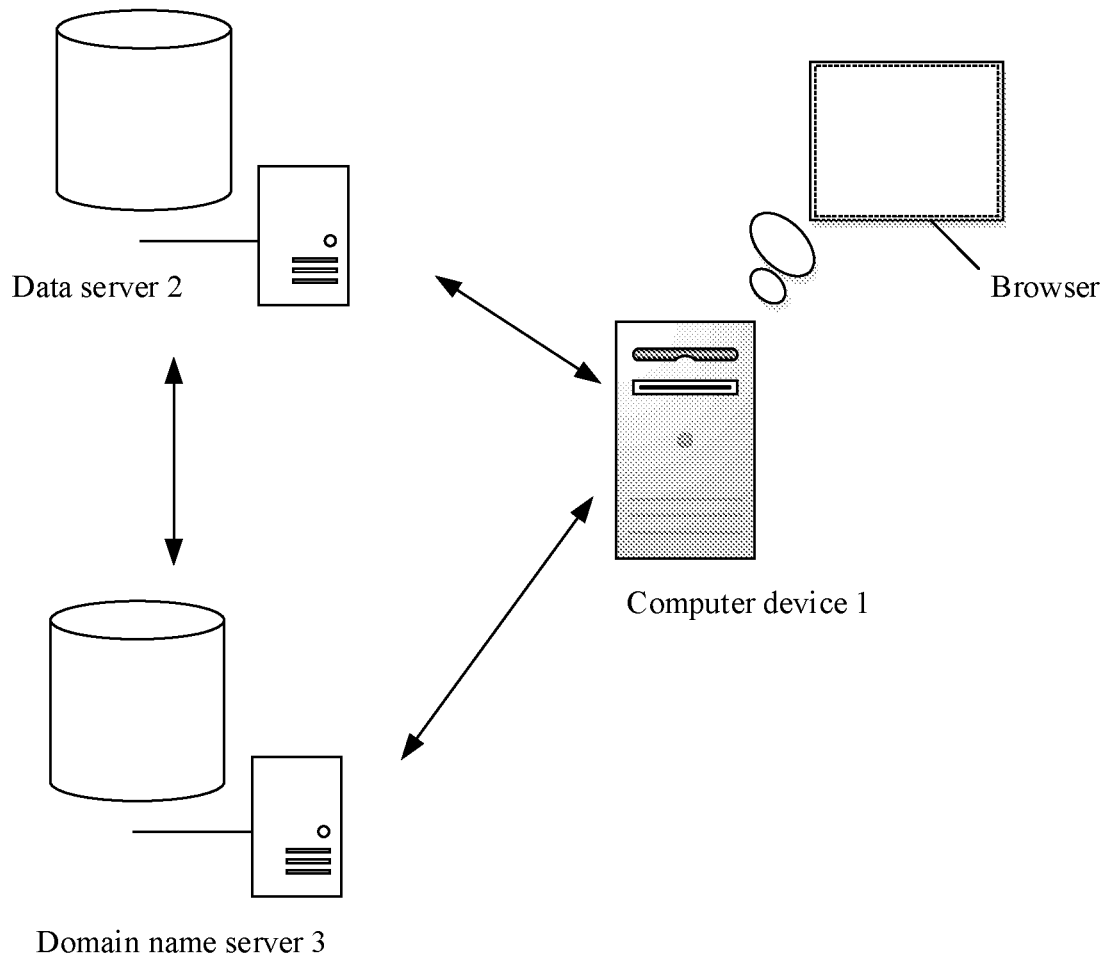
FIG. 1 is a schematic diagram of an application environment according to an embodiment of this application.

FIG. 1 is a schematic diagram of an application environment according to an embodiment of this application. Referring to FIG. 1, a computer device 1, a data server computing system 2, and a domain name server computing system 3 are connected to each other. The computer device 1 provides a user interface, used to display a browser page, and can receive, by using the browser page, a resource address entered by a user.

When the data server 2 needs to register a domain name, the data server 2 may send a to-be-registered domain name field and IP address to the domain name server 3. Then, the domain name server 3 may receive the domain name field and the IP address that are sent by the data server; combine the domain name field and the IP address according to a preset domain name encryption rule to generate a domain name corresponding to the IP address, and register the domain name; and synchronize a domain name decryption rule corresponding to the domain name encryption rule to a domain name resolution configuration file. After receiving, by using the browser page, the resource address entered by the user, the computer device 1 may receive the resource address entered by the user; obtain a target domain name corresponding to the resource address, where the target domain name is generated according to a preset domain name encryption rule, and the domain name encryption rule is used to combine a domain name field and an IP address into the target domain name; and obtain the IP address in the target domain name through resolution according to a preset domain name decryption rule.

In this embodiment, the computer device 1 may be used as a mobile phone, a tablet computer, a portable device, a PC, or another electronic device with a display function. The data server 2 and the domain name server 3 each may be used as a mobile phone, a tablet computer, a portable device, a PC, a server, or the like.

Embodiment 1

Figure 2:
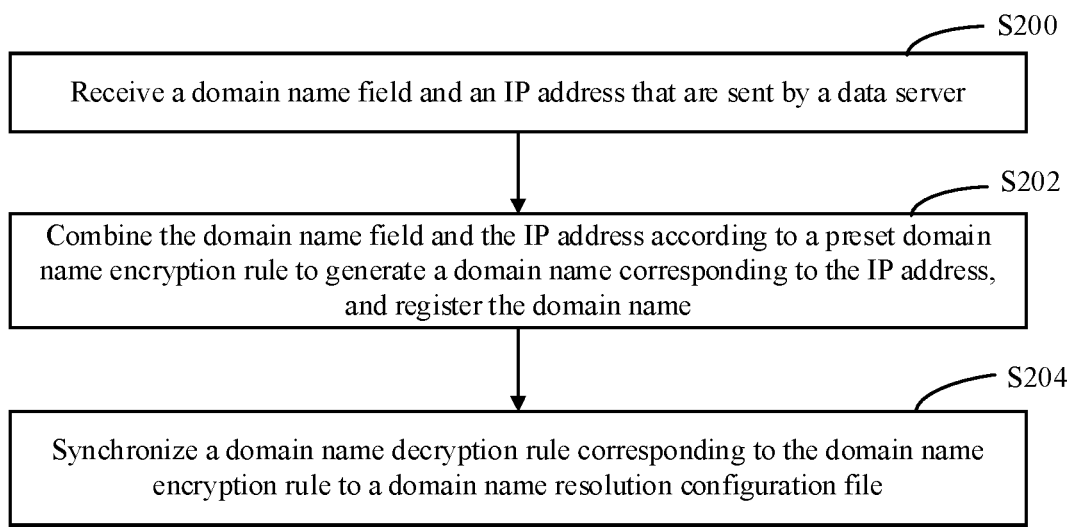
FIG. 2 is a schematic flowchart of a specific embodiment of a domain name registration method according to this application.

FIG. 2 is a schematic flowchart of an embodiment of a domain name registration method according to this application. It may be understood that the flowchart in this method embodiment is not used to limit a step execution sequence. The following provides example descriptions by using the domain name server 3 in FIG. 1 as an execution body.

As shown in FIG. 2, the domain name registration method may include steps S200 to S204.

Step S200: Receive a domain name field and an IP address that are sent by a data server.

Specifically, when the data server 2 needs to register a domain name, the data server 2 may send the to-be-registered domain name field and IP address to the domain name server 3. Then, the domain name server 3 may receive the domain name field and the IP address that are sent by the data server 2.

Step S202: Combine the domain name field and the IP address according to a preset domain name encryption rule to generate a domain name corresponding to the IP address, and register the domain name.

After receiving the domain name field and the IP address that are sent by the data server 2, the domain name server 3 encrypts and combines the domain name field and the IP address according to the preset domain name encryption rule, to generate the domain name corresponding to the IP address. In this embodiment, the domain name encryption rule includes: generating an IP field based on the IP address in a form of a number, a punctuation, and a character, and combining the IP field and the domain name field into the domain name corresponding to the IP address. The domain name encryption rule may be considered as a combination manner in which the domain name field and the IP address are combined together. For example, the domain name server 3 provides an interaction interface or a data interface, used to receive the domain name encryption rule entered by a user; and uses the received domain name encryption rule to perform domain name registration on the domain name field and the IP address that are received from the data server 2, specifically including: jointly adding the domain name field and the IP address to a domain name description. For example, if the data server 2 sends an IP address 192.5.6.30 and a domain name baidu.com to the domain name server 3, the domain name server 3 combines 192.5.6.30 and baidu.com together according to the preset domain name encryption rule, to generate a domain name that points to the IP address 192.5.6.30, that is, combines 192.5.6.30 and baidu.com together in a specific manner as a domain name corresponding to the IP address 192.5.6.30. For example, the generated domain name is x192x5x6x30x.baidu.com, where baidu is a second-level generic domain name.

In another specific embodiment, when the IP address includes IP addresses of different protocol versions, that the domain name server 3 combines the domain name field and the IP address according to a preset domain name encryption rule includes: jointly writing the IP addresses corresponding to all the protocol versions to the domain name corresponding to the IP address, and marking the corresponding protocol versions. Specifically, that the domain name server 3 jointly writes the IP addresses corresponding to all the protocol versions to the domain name corresponding to the IP address, and marking the corresponding protocol versions includes: separating the IP addresses corresponding to the different protocol versions by using different delimiters, where each delimiter separates an IP address of one protocol version. In this embodiment, an existing IP address generally includes different internet protocol versions, such as an internet protocol version 4 (IPv4) and an internet protocol version 6 (IPv6). Therefore, when the domain name that needs to be registered by the data server 2 points to a plurality of different IP addresses, and the different IP addresses belong to different internet protocol versions, the domain name server 3 receives one domain name field and IP addresses of a plurality of different protocol versions. Then, the domain name server 3 jointly combines the IP addresses of all the protocol versions and the domain name field according to the domain name encryption rule, to generate a corresponding domain name.

For example, if the IP address corresponding to the domain name that needs to be registered by the data server 2 includes IPV4: 192.168.1.2 and IPV6: 2409:8c0c:310:1800::11, and the domain name field is baidu.com, the domain name server 3 jointly combines the IP addresses IPV4: 192.168.1.2 and IPV6: 2409:8c0c:310:1800::11 and the domain name field baidu.com according to the domain name encryption rule, to generate a corresponding domain name:
xy192x168x1x2xy2409y8c0cy310y1800yy11xy.baidu.com.
The IP address included in the domain name starts and ends with "xy", that is, includes identifiers "x" and "y", indicating that both an IP address of an IPV4 and an IP address of an IPV6 are included. A number in the IP address remains unchanged, "." in the IP address of the IPV4 is replaced with "x" as an identifier of the IP address of the IPV4, and ":" in the IP address of the IPV6 is replaced with "y" as an identifier of the IP address of the IPV6.

Step S204: Synchronize a domain name decryption rule corresponding to the domain name encryption rule to a domain name resolution configuration file.

After encrypting the domain name field and the IP address according to the domain name encryption rule to generate the corresponding domain name, the domain name server 3 associates the domain name and the corresponding IP address, and performs registration and storage. In addition, the domain name server 3 further synchronizes the domain name decryption rule corresponding to the domain name encryption rule to the domain name resolution configuration file. The domain name resolution configuration file is stored in a local storage unit preset by the domain name server 3. In this embodiment, the domain name resolution configuration file is used by the computer device 1 to: after receiving a resource address entered by the user, perform a corresponding domain name resolution process on the resource address according to a rule in the domain name resolution configuration file.

Embodiment 2

Figure 3:
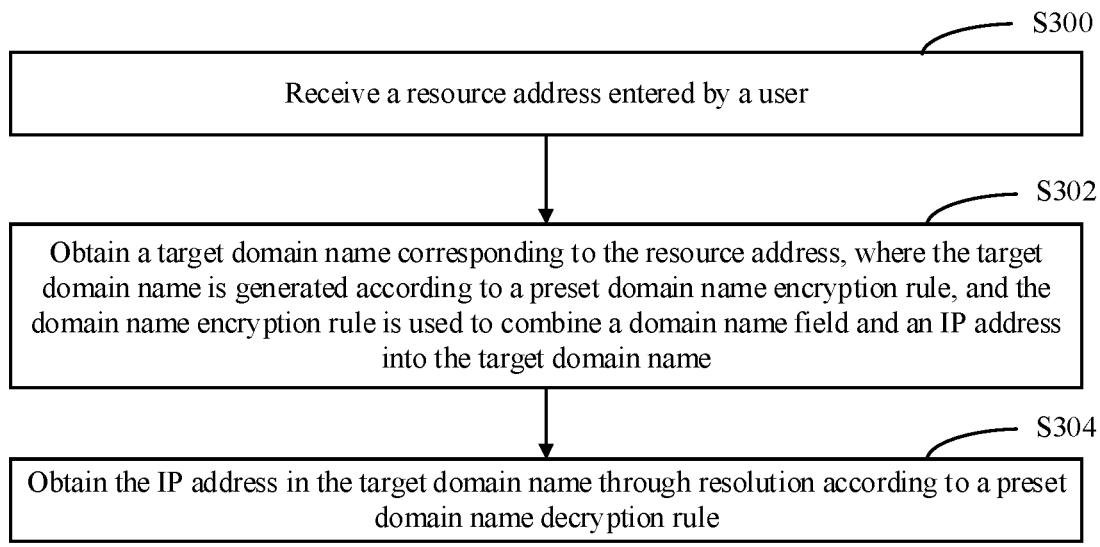
FIG. 3 is a schematic flowchart of a specific embodiment of a domain name resolution method according to this application.

FIG. 3 is a schematic flowchart of an embodiment of a domain name resolution method according to this application. It may be understood that the flowchart in this method embodiment is not used to limit a step execution sequence. The following provides example descriptions by using the computer device 1 in FIG. 1 as an execution body.

As shown in FIG. 3, the domain name resolution method may include step S300 to S304.

Step S300: Receive a resource address entered by a user.

Step 302: Obtain a target domain name corresponding to the resource address, where the target domain name is generated according to a preset domain name encryption rule, and the domain name encryption rule is used to combine a domain name field and an IP address into the target domain name.

Specifically, after receiving, by using the browser page, the resource address entered by the user, the computer device 1 may receive the resource address entered by the user. In this embodiment, the computer device 1 receives, by using the browser page, the resource address entered by the user. However, the resource address entered by the user does not necessarily conform to a specification or is not necessarily a domain name corresponding to a to-be-accessed resource. Therefore, in a specific embodiment, after receiving the resource address entered by the user, the computer device 1 further obtains the target domain name corresponding to the resource address, including: identifying the domain name field included in the resource address; and supplementing the domain name field according to a preset domain name correction rule, to obtain the corresponding target domain name. In this embodiment, in a domain name registration process, when generating the corresponding target domain name based on the domain name field and the IP address that are submitted by the data server 2, the domain name server 3 also generates, based on the domain name field, an associated domain name field that includes a character or a number that is "less standard" than that included in the domain name field, for example, generates, based on a domain name field "baidu", "biadu" and "badu" as associated domain name fields corresponding to "baidu"; and updates the associated domain name field to the preset correction rule and synchronizes the associated domain name field to a network. After connecting to the network, the computer device 1 can obtain a configuration file related to domain name resolution, and store the configuration file in a browser, where the configuration file includes the correction rule.

Therefore, after receiving a "less standard" resource address entered by the user, the computer device 1 supplements the domain name field according to the correction rule, to obtain the corresponding target domain name. For example, "badu" entered by the user is corrected according to the correction rule, to obtain a domain name x192x5x6x30x.baidu.com corresponding to "baidu".

Step S304: Obtain the IP address in the target domain name through resolution according to a preset domain name decryption rule.

Then, the computer device 1 further obtains the IP address in the target domain name through resolution according to the preset domain name decryption rule. The domain name decryption rule is stored in a domain name resolution configuration file in a preset local storage unit. The computer device 1 identifies an IP field in the target domain name; and identifies a number, a punctuation, and a character in the IP field to obtain the corresponding IP address.

In this embodiment, after connecting to the network, the computer device 1 can obtain the configuration file related to domain name resolution, namely, the domain name resolution configuration file. Then, the computer device 1 obtains the domain name decryption rule from the domain name resolution configuration file, and performs domain name resolution on the target domain name according to the domain name decryption rule, including: identifying the IP field in the target domain name, and then identifying an IP address of an IPV4 and/or an IP address of an IPV6 from the IP address based on IP address identifiers of different protocol versions. For example, based on a target domain name x192x5x6x30x.baidu.com, the computer device 1 may learn, through resolution based on an identifier "x" corresponding to the IP address of the IPV4, that an IP address in the target domain name is the IP address of the IPV4: 192.5.6.30.

In addition, when the computer device 1 cannot obtain the IP address in the target domain name through resolution according to the domain name decryption rule or the domain name resolution configuration file does not include the domain name decryption rule, the computer device 1 sends the target domain name to the domain name server for resolution; and downloads a domain name resolution configuration file of the latest version from the domain name server. In an example embodiment, for the domain name resolution configuration file preset by the domain name server 3, the following implementation is further included: The computer device 1 decrypts the obtained target domain name according to the locally stored domain name decryption rule in the browser, to obtain the corresponding IP address; and when the computer device 1 cannot obtain the IP address corresponding to the target domain name through decryption according to the domain name decryption rule or the domain name resolution configuration file does not include the domain name decryption rule, the computer device 1 needs to send the target domain name to the domain name server 3 to perform a normal domain name resolution step, and further downloads the domain name resolution configuration file of the latest version from the domain name server after domain name resolution. That is, the computer device 1 can directly resolve, by using the locally stored domain name resolution configuration file, the resource address entered by the user, to obtain the corresponding IP address, and also supports the following currently commonly performed operation: sending, to the domain name server for resolution, the received resource address entered by the user, to implement good compatibility.

In another specific embodiment, after the step of obtaining a target domain name corresponding to the resource address, the computer device 1 further performs the following steps: obtaining the IP address in the target domain name through resolution according to the domain name decryption rule, and simultaneously sending the target domain name to the domain name server to obtain the IP address corresponding to the target domain name through resolution by using the domain name server; and after obtaining the IP address corresponding to the target domain name through resolution by using the domain name decryption rule or the domain name server, performing resource access based on the IP address that is first obtained through resolution. That is, after obtaining the target domain name, the computer device 1 may simultaneously perform domain name resolution in two manners, and then perform corresponding resource access based on the IP address that is first obtained through resolution, to implement fast and efficient domain name resolution and resource access processes.

In conclusion, according to the domain name resolution method provided in this application, the resource address entered by the user can be received; the target domain name corresponding to the resource address can be received, where the target domain name is generated according to the preset domain name encryption rule, and the domain name encryption rule is used to combine the domain name field and the IP address into the target domain name; and the IP address in the target domain name can be obtained through resolution according to the preset domain name decryption rule. The resource address entered by the user is directly resolved, so that the IP address can be rapidly obtained through resolution, thereby shortening domain name resolution time and improving domain name resolution efficiency.

Embodiment 3

Figure 4:
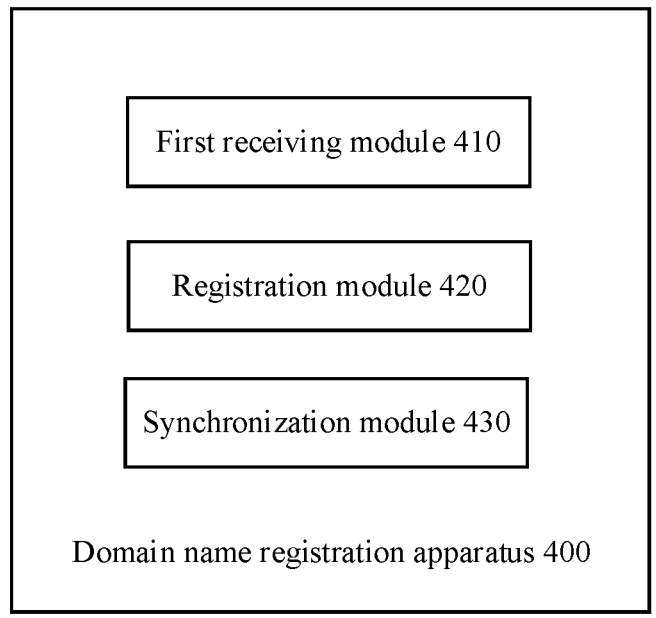
FIG. 4 is a schematic diagram of program modules of an embodiment of a domain name registration apparatus according to this application.

FIG. 4 is a schematic block diagram of a domain name registration apparatus according to Embodiment 3 of this application. The domain name registration apparatus may be divided into one or more program modules. The one or more program modules are stored in a storage medium and executed by one or more processors, to complete this embodiment of this application. The program module in this embodiment of this application is a series of computer program instruction segments that can complete a specific function. The following specifically describes a function of each program module in this embodiment.

As shown in FIG. 4, the domain name registration apparatus 400 may include a first receiving module 410, a registration module 420, and a synchronization module 430.

The first receiving module 410 is configured to receive a domain name field and an IP address that are sent by a data server.

The registration module 420 is configured to: combine the domain name field and the IP address according to a preset domain name encryption rule to generate a domain name corresponding to the IP address, and register the domain name.

The synchronization module 430 is configured to synchronize a domain name decryption rule corresponding to the domain name encryption rule to a domain name resolution configuration file. The domain name resolution configuration file is stored in a preset local storage unit.

In an example, the domain name encryption rule includes: generating an IP field based on the IP address in a form of a number, a punctuation, and a character, and combining the IP field and the domain name field into the domain name corresponding to the IP address.

In an example, the registration module 420 is further configured to: when the IP address includes IP addresses of different protocol versions, jointly write the IP addresses corresponding to all the protocol versions to the domain name corresponding to the IP address, and mark the corresponding protocol versions. The jointly writing the IP addresses corresponding to all the protocol versions to the domain name corresponding to the IP address, and marking the corresponding protocol versions includes: separating the IP addresses corresponding to the different protocol versions by using different delimiters, where each delimiter separates an IP address of one protocol version.

Embodiment 4

Figure 5:
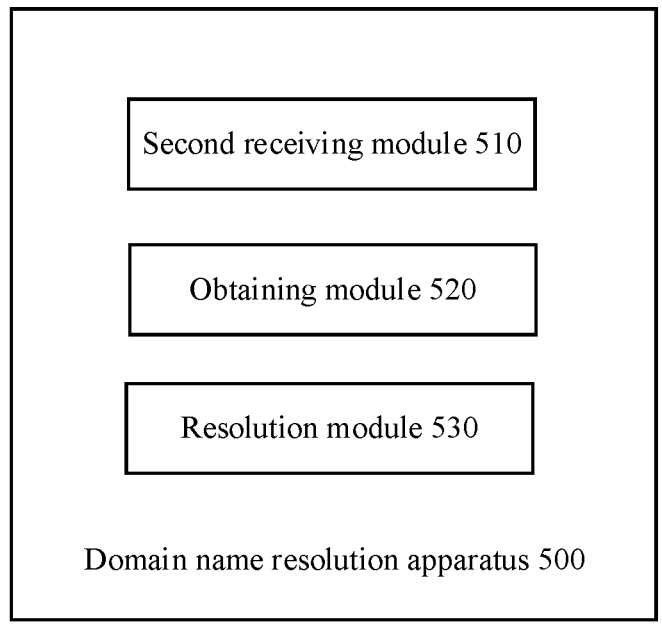
FIG. 5 is a schematic diagram of program modules of an embodiment of a domain name resolution apparatus according to this application.

FIG. 5 is a schematic block diagram of a domain name resolution apparatus according to Embodiment 4 of this application. The domain name resolution apparatus may be divided into one or more program modules. The one or more program modules are stored in a storage medium and executed by one or more processors, to complete this embodiment of this application. The program module in this embodiment of this application is a series of computer program instruction segments that can complete a specific function. The following specifically describes a function of each program module in this embodiment.

As shown in FIG. 5, the domain name resolution apparatus 500 may include a second receiving module 510, an obtaining module 520, and a resolution module 530.

The second receiving module 510 is configured to receive a resource address entered by a user.

The obtaining module 520 is configured to obtain a target domain name corresponding to the resource address, where the target domain name is generated according to a preset domain name encryption rule, and the domain name encryption rule is used to combine a domain name field and an IP address into the target domain name.

The resolution module 530 is configured to obtain the IP address in the target domain name through resolution according to a preset domain name decryption rule. The domain name decryption rule is stored in a domain name resolution configuration file in a preset local storage unit.

In an example, the obtaining module 520 is further configured to: identify the domain name field included in the resource address; and supplement the domain name field according to a preset domain name correction rule, to obtain the corresponding target domain name.

In an example, the resolution module 530 is further configured to: identify an IP field in the target domain name; and identify a number, a punctuation, and a character in the IP field to obtain the corresponding IP address.

In an example, the resolution module 530 is further configured to: when the IP address in the target domain name cannot be obtained through resolution according to the domain name decryption rule or the domain name resolution configuration file does not include the domain name decryption rule, send the target domain name to a domain name server for resolution; and download a domain name resolution configuration file of the latest version from the domain name server.

In an example, the resolution module 530 is further configured to: after the target domain name corresponding to the resource address is obtained, obtain the IP address in the target domain name through resolution according to the domain name decryption rule, and simultaneously send the target domain name to the domain name server to obtain the IP address corresponding to the target domain name through resolution by using the domain name server; and after obtaining the IP address corresponding to the target domain name through resolution by using the domain name decryption rule or the domain name server, perform resource access based on the IP address that is first obtained through resolution.

Embodiment 5

Figure 6:
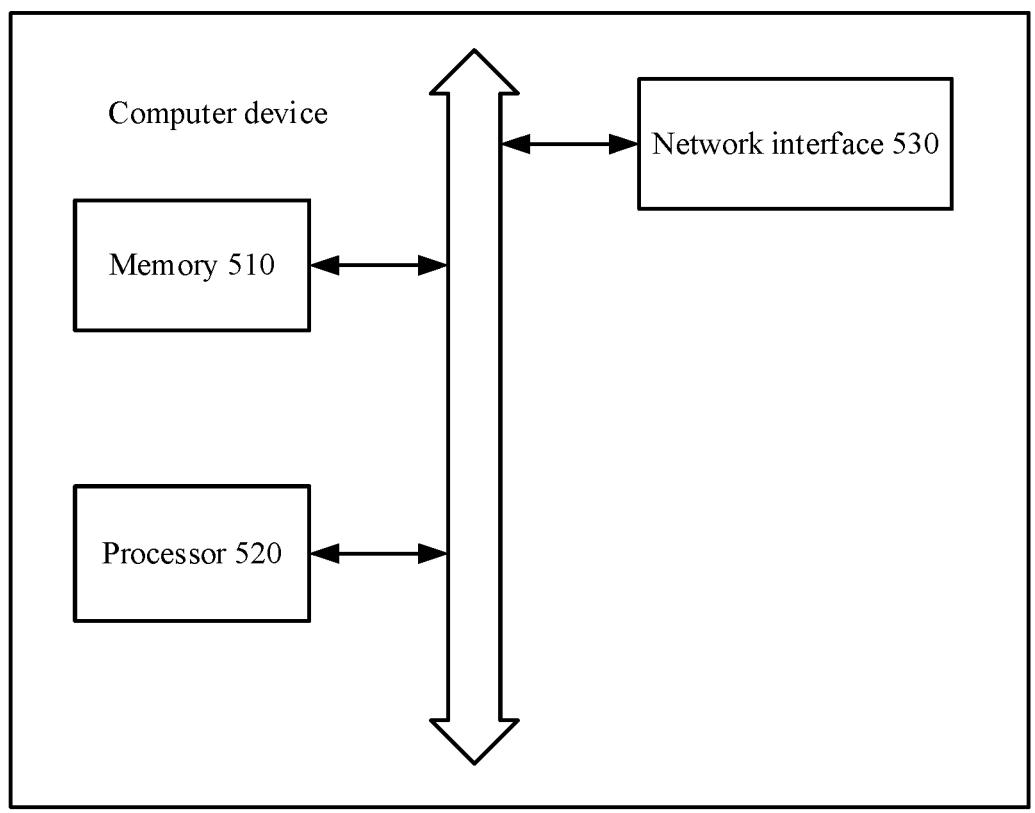
FIG. 6 is a schematic diagram of an optional hardware architecture of a computing system according to this application.

FIG. 6 is a schematic diagram of a hardware architecture of a computing system that corresponds to the domain name server 3 suitable for implementing a domain name registration method or the computer device 1 suitable for implementing a domain name resolution method according to Embodiment 5 of this application. In this embodiment, the computer device is a device that can automatically perform value calculation and/or information processing according to an instruction that is set or stored in advance. For example, the computer device may be a rack server, a blade server, a tower server, or a cabinet server (including an independent server, or a server cluster including a plurality of servers) that has a gateway function. As shown in FIG. 6, the computing device includes at least but is not limited to a memory 510, a processor 520, and a network interface 530 that can be communicatively linked to each other by using a system bus.

The memory 510 includes at least one type of computer-readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 510 may be an internal storage module of the computer device, for example, a hard disk or a memory of the computer device. In some other embodiments, the memory 510 may be an external storage device of the computer device, for example, a plug-connected hard disk, a smart media card (SMC), a secure digital (SD) card, or a flash card that is disposed in the computing device. Certainly, the memory 510 may alternatively include both an internal storage module of the computing device and an external storage device of the computing device. In this embodiment, the memory 510 is usually configured to store an operating system and various types of application software that are installed on the computing device, for example, program code of the domain name resolution method. In addition, the memory 510 may be further configured to temporarily store various types of data that has been output or that is to be output.

The processor 520 may be a central processing unit (CPU), a controller, a microcontroller, a microprocessor, or another data processing chip in some embodiments. The processor 520 is usually configured to control an overall operation of the computing device, for example, perform control and processing that are related to data interaction or communication performed by the computing device. In this embodiment, the processor 520 is configured to run program code stored in the memory 510 or process data.

The network interface 530 may include a wireless network interface or a wired network interface, and the network interface 530 is usually configured to establish a communication link between the computing device and another device. For example, the network interface 530 is configured to: connect the computing device to an external terminal by using a network, and establish a data transmission channel and a communication link between the computing device and the external terminal. The network may be a wireless or wired network such as an intranet, the Internet, a global system for mobile communications (GSM), a wideband code division multiple access (WCDMA), a 4G network, a 5G network, Bluetooth, or Wi-Fi.

It should be noted that FIG. 6 shows only the computer device having the components 510 to 530. However, it should be understood that implementation of all the shown components is not required, and more or fewer components may be alternatively implemented.

In this embodiment, program code of the domain name registration method or the program code of the domain name resolution method that is stored in the memory 510 may be further divided into one or more program modules, and is executed by one or more processors (the processor 520 in this embodiment), to complete this embodiment of this application.

Embodiment 6

This embodiment further provides a computer-readable storage medium. The computer-readable storage medium stores a computer program, and the following steps are implemented when the computer program is executed by a processor:

receiving a domain name field and an IP address that are sent by a data server; combining the domain name field and the IP address according to a preset domain name encryption rule, to generate a domain name corresponding to the IP address, and registering the domain name; and synchronizing a domain name decryption rule corresponding to the domain name encryption rule to a domain name resolution configuration file.

Alternatively, the computer-readable storage medium stores a computer program, and the following steps are implemented when the computer program is executed by a processor:

receiving a resource address entered by a user; obtaining a target domain name corresponding to the resource address, where the target domain name is generated according to a preset domain name encryption rule, and the domain name encryption rule is used to combine a domain name field and an IP address into the target domain name; and obtaining the IP address in the target domain name through resolution according to a preset domain name decryption rule.

In this embodiment, the computer-readable storage medium includes a flash memory, a hard disk, a multimedia card, a card-type storage (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computing device, for example, a hard disk or a memory of the computing device. In some other embodiments, the computer-readable storage medium may be an external storage device of the computing device, for example, a plug-connected hard disk, a smart media card (SMC), a secure digital (SD) card, or a flash card that is disposed in the computing device. Certainly, the computer-readable storage medium may alternatively include both an internal storage unit of the computing device and an external storage device of the computing device. In this embodiment, the computer-readable storage medium is usually configured to store an operating system and various types of application software that are installed on a computing device, for example, the program code of the domain name registration method in the embodiments or the program code of the domain name resolution method in the embodiments. In addition, the computer-readable storage medium may be further configured to temporarily store various types of data that has been output or that is to be output.

Clearly, a person skilled in the art should understand that the foregoing modules or steps in the embodiments of this application may be implemented by using a general computing apparatus. The modules or steps may be integrated into a single computing apparatus or distributed in a network including a plurality of computing apparatuses. Optionally, the modules or steps may be implemented by using program code that can be executed by the computing apparatus. Therefore, the modules or steps may be stored in a storage apparatus for execution by the computing apparatus. In addition, in some cases, the shown or described steps may be performed in a sequence different from the sequence herein. Alternatively, the modules or steps may be separately made into integrated circuit modules, or a plurality of modules or steps in the modules or steps are made into a single integrated circuit module for implementation. In this way, the embodiments of this application are not limited to any specific hardware and software combination.

The foregoing descriptions are merely preferred embodiments in the embodiments of this application, and are not intended to limit the patent scope of the embodiments of this application. Any equivalent structure or equivalent process change that is made by using the content of the specification and the accompanying drawings of the embodiments of this application or that is directly or indirectly applied to other related technical fields shall also fall within the patent protection scope of the embodiments of this application.

What is claimed is:

1. A domain name registration method, comprising:
    receiving a domain name field and an Internet Protocol (IP) address that are sent from a data server;
    generating a domain name corresponding to the IP address by combining the domain name field and the IP address based on a preset domain name encryption rule, and registering the domain name; and
    synchronizing a domain name decryption rule corresponding to the preset domain name encryption rule to a domain name resolution configuration file,
    wherein the IP address comprises different protocol versions of IP address, and wherein the combining the domain name field and the IP address based on the preset domain name encryption rule further comprises:
    writing each of the different protocol versions of IP address into the domain name corresponding to the IP address, and
    marking a corresponding protocol version for each of the different protocol versions of IP address.

2. The domain name registration method according to claim 1, wherein the preset domain name encryption rule is applied to perform operations comprising:
    generating an IP field in a form of numbers, punctuations, and characters based on the IP address; and
    combining the IP field and the domain name field into the domain name corresponding to the IP address.

3. The domain name registration method according to claim 1, wherein the writing each of the different protocol versions of IP address into the domain name corresponding to the IP address further comprises:
    separating the different protocol versions of IP address using different delimiters, wherein each respective delimiter applied to separate one of the different protocol versions of IP address.

4. The domain name registration method according to claim 1, wherein the domain name resolution configuration file is stored in a preset local storage unit.

5. A domain name resolution method, comprising:
    receiving a resource address entered by a user;
    obtaining a target domain name corresponding to the received resource address, wherein the target domain name is generated based on a preset domain name encryption rule, and the preset domain name encryption rule is applied to combine a domain name field and an Internet Protocol (IP) address into the target domain name;
    parsing the target domain name and obtaining the IP address in the target domain name based on a preset domain name decryption rule;
    wherein after the obtaining the target domain name corresponding to the received resource address, the domain name resolution method further comprises:
    simultaneously sending the target domain name to a domain name server to obtain the IP address corresponding to the target domain name by using the domain name server while parsing the target domain name and obtaining the IP address in the target domain name based on the preset domain name decryption rule; and
    performing resource access based on the IP address that is first obtained from the domain name server or by parsing the target domain name based on the preset domain name decryption rule.

6. The domain name resolution method according to claim 5, wherein the obtaining the target domain name corresponding to the received resource address comprises:
    identifying the domain name field comprised in the received resource address; and
    supplementing the domain name field according to a preset domain name correction rule to obtain the target domain name.

7. The domain name resolution method according to claim 5, wherein the parsing the target domain name and obtaining the IP address in the target domain name based on the preset domain name decryption rule comprises:
    identifying an IP field in the target domain name; and
    determining the IP address based on parsing numbers, punctuations, and characters in the IP field.

8. The domain name resolution method according to claim 5, wherein the preset domain name decryption rule is stored in a domain name resolution configuration file in a preset local storage unit.

9. The domain name resolution method according to claim 5, further comprising:
    in response to detecting a failure to obtain the IP address in the target domain name based on the preset domain name decryption rule or in response to determining that the domain name resolution configuration file does not comprise the preset domain name decryption rule, sending the target domain name to a domain name server for resolution; and
    downloading a latest version of domain name resolution configuration file from the domain name server.

10. A computing system, wherein the computing system comprises a memory and a processor, the memory stores a computer program that upon execution by the processor causes the processor to perform operations comprising:
    receiving a domain name field and an Internet Protocol (IP) address that are sent from a data server;
    generating a domain name corresponding to the IP address by combining the domain name field and the IP address based on a preset domain name encryption rule, and registering the domain name; and
    synchronizing a domain name decryption rule corresponding to the preset domain name encryption rule to a domain name resolution configuration file,
    wherein the IP address comprises different protocol versions of IP address, and wherein the combining the domain name field and the IP address based on the preset domain name encryption rule further comprises:
    writing each of the different protocol versions of IP address into the domain name corresponding to the IP address, and
    marking a corresponding protocol version for each of the different protocol versions of IP address.

11. The computing system according to claim 10, wherein the preset domain name encryption rule is applied to perform operations comprising:

generating an IP field in a form of numbers, punctuations, and characters based on the IP address; and combining the IP field and the domain name field into the domain name corresponding to the IP address.

12. A computing device, wherein the computing device comprises a memory and a processor, the memory stores a computer program that upon execution by the processor causes the processor to perform operations comprising:

receiving a resource address entered by a user;

obtaining a target domain name corresponding to the received resource address, wherein the target domain name is generated based on a preset domain name encryption rule, and the domain name encryption rule is applied to combine a domain name field and an Internet Protocol (IP) address into the target domain name;

parsing the target domain name and obtaining the IP address in the target domain name based on a preset domain name decryption rule;

wherein after the obtaining the target domain name corresponding to the received resource address, the operations further comprise:

simultaneously sending the target domain name to a domain name server to obtain the IP address corresponding to the target domain name by using the domain name server while parsing the target domain name and obtaining the IP address in the target domain name based on the preset domain name decryption rule; and performing resource access based on the IP address that is first obtained from the domain name server or by parsing the target domain name based on the preset domain name decryption rule.

13. The computing device according to claim 12, wherein the obtaining the target domain name corresponding to the received resource address comprises:

identifying the domain name field comprised in the received resource address; and supplementing the domain name field according to a preset domain name correction rule to obtain the target domain name.

14. The computing device according to claim 12, wherein the parsing the target domain name and obtaining the IP address in the target domain name based on the preset domain name decryption rule comprises:

identifying an IP field in the target domain name; and determining the IP address based on parsing numbers, punctuations, and characters in the IP field.

15. The computing device according to claim 12, wherein the preset domain name decryption rule is stored in a domain name resolution configuration file in a preset local storage unit.

16. The computing device according to claim 12, the operations further comprising:

in response to detecting a failure to obtain the IP address in the target domain name based on the preset domain name decryption rule or in response to determining that the domain name resolution configuration file does not comprise the preset domain name decryption rule, sending the target domain name to a domain name server for resolution; and downloading a latest version of domain name resolution configuration file from the domain name server.

* * * * *